United States Patent [19]
Tokarz et al.

[11] Patent Number: 5,301,987
[45] Date of Patent: Apr. 12, 1994

[54] CONVERTIBLE TOP STACK LATCH

[75] Inventors: Stephen P. Tokarz, Flat Rock; David J. Siefert, New Hudson; Stanley S. Maday, Grosse Point, all of Mich.

[73] Assignee: ASC Incorporated, Southgate, Mich.

[21] Appl. No.: 940,570

[22] Filed: Sep. 4, 1992

[51] Int. Cl.⁵ .............................................. E05C 1/12
[52] U.S. Cl. .................... 292/39; 292/DIG. 5; 296/121
[58] Field of Search ............... 292/63, 68, 39, DIG. 5, 292/25, 11, 51, 112, 8, 22, 160, 157, 142; 296/121, 120.1, 107, 116

[56] References Cited

U.S. PATENT DOCUMENTS

| | | |
|---|---|---|
| 1,174,366 | 3/1916 | Van Den Plas . |
| 1,892,512 | 12/1932 | Kemp .............................. 292/142 X |
| 2,201,330 | 5/1940 | Wernig et al. ............ 292/DIG. 5 X |
| 2,486,905 | 11/1949 | Ackermans . |
| 2,560,459 | 7/1951 | Lundberg et al. ........ 292/DIG. 5 X |
| 2,570,261 | 10/1951 | Milhan . |
| 2,586,648 | 2/1952 | Hale et al. . |
| 2,785,914 | 3/1957 | Thomas et al. .......................... 292/7 |
| 2,831,718 | 4/1958 | Hallek et al. . |
| 2,852,292 | 9/1958 | Galla . |
| 2,879,988 | 3/1959 | Klisch ............................... 292/160 X |
| 3,089,719 | 5/1963 | Csizmansky ............... 292/DIG. 5 X |
| 3,353,864 | 11/1967 | Antaya et al. . |
| 3,425,742 | 2/1969 | Rauber, Jr. .......................... 296/121 |
| 4,618,180 | 10/1986 | Muscat . |
| 4,664,436 | 5/1987 | Eyb . |
| 4,746,163 | 5/1988 | Muscat ............................... 296/120.1 |
| 4,801,173 | 1/1989 | Trenkler ..................... 292/DIG. 5 X |
| 4,830,425 | 5/1989 | Muscat ............................... 296/107 |
| 4,830,426 | 5/1989 | Schlachter et al. . |
| 5,064,241 | 11/1991 | Ohrle .......................... 292/DIG. 5 X |
| 5,067,768 | 11/1991 | Fischbach .......................... 296/107 |
| 5,085,483 | 2/1992 | Alexander ........................... 296/121 |

FOREIGN PATENT DOCUMENTS

| | | | |
|---|---|---|---|
| 805229 | 5/1951 | Fed. Rep. of Germany ........ 292/25 |
| 536578 | 5/1941 | United Kingdom ................... 292/25 |

*Primary Examiner*—Rodney M. Lindsey
*Attorney, Agent, or Firm*—Harness, Dickey & Pierce

[57] ABSTRACT

A latching mechanism for a convertible top where a single drive mechanism engages and disengages multiple latching points. The latching mechanism serves not only to secure the convertible top but to pull down the top into position as it is being secured.

20 Claims, 3 Drawing Sheets

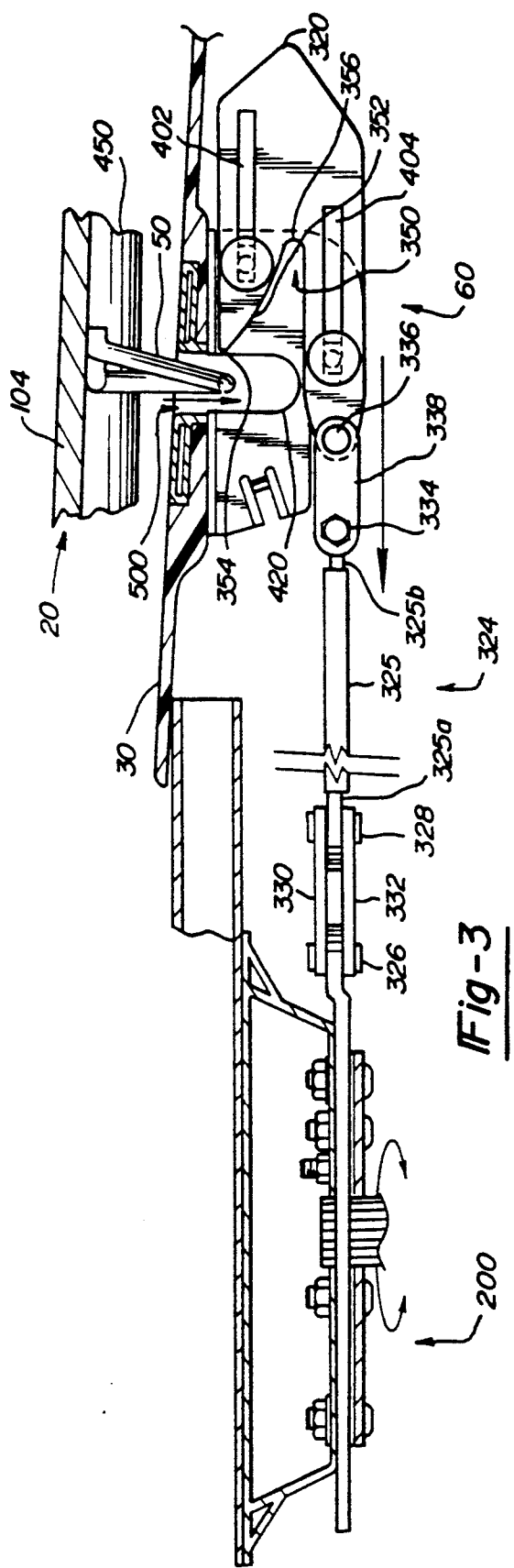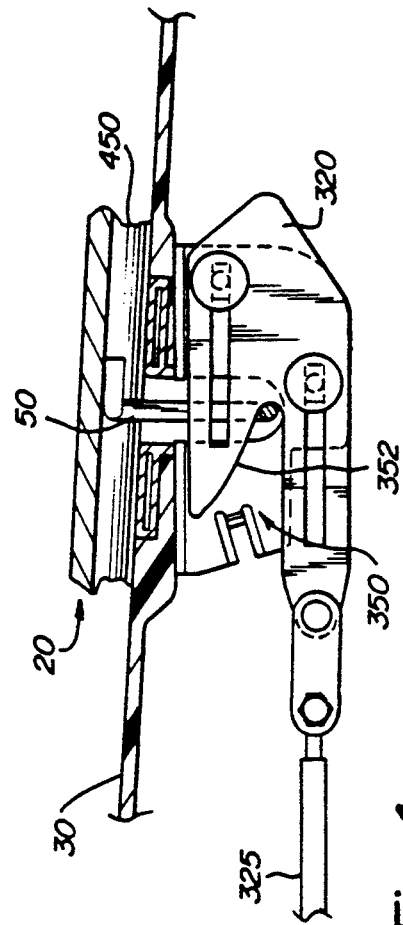

CONVERTIBLE TOP STACK LATCH

BACKGROUND OF THE INVENTION

This invention relates generally to a means for securing movable panels, and more particularly to a latch mechanism for securing an automotive convertible top to a tonneau cover or trunk lid.

In the field of automotive design, various types of latches are used to secure movable body panels to the main portion of the auto body. For example, latches secure the doors, hood, trunk lid, convertible top five bow and tonneau cover. While a latch is obviously designed to secure the panel with respect to the rest of the auto body, latches also serve several other functions. Given that fit and finish are important customer design criteria, it is important that a latch secure the movable body panel so that it lies flush with the rest of the exterior body panels. Also, in areas such as the doors, trunk lid, convertible top five bow and tonneau cover, the latch must hold the movable panel such that it contacts weather sealing so that water and road debris do not infiltrate the automobile. However, the latch must also prevent the movable panel from being snugged too closely to the other body panels, or else the weather sealing may be damaged by excessive compression.

In the past, automotive body panel latches were comprised of striker pin and catch mechanisms employing springs or other such purely mechanical devices to secure the pin within the catch. While still used widely, these older latch mechanisms are being replaced by electromechanical latching mechanisms. In these newer forms of latches, the function of latching often includes a "pull down" function as well. However, the electromechanical systems currently available in the market today have several drawbacks.

One disadvantage of known latching mechanisms employing a pull down function is that separate mechanisms must be provided at each latching point. For example, it may be desirable to secure an automobile convertible top five bow along both of the outer corners of the five bow nearest the rearmost portion of the tonneau cover and rear quarter panels. An electromechanical system using screw motors would require two separate screw motors, one for each latching point.

It would therefore be advantageous to provide for a latching mechanism utilizing a pull down function which can employ a single drive mechanism for multiple latching points. It would be further advantageous to provide for a latching mechanism capable of providing both the latching and pull down feature in a single mechanism.

SUMMARY OF THE INVENTION

The present invention provides for a means for securing a movable body panel to fixed body panels. A latch loop disposed on the movable body panel engages a catch associated with the fixed body panels. The catch and latch loop serve to both pull down the movable body panel into position with respect to the fixed body panels, and also serve to secure the movable body panel with respect to the fixed body panels once in position.

BRIEF DESCRIPTION OF THE DRAWINGS

The various objects, features and advantages of the present invention will become more apparent by referring to the following discussion in conjunction with the drawings in which:

FIG. 3 is a partially broken away side view illustrating the catch mechanism in the disengaged position;

FIG. 4 is a partially broken away side view illustrating the catch mechanism engaged;

FIG. 5 is an exploded view detailing the various components of the catch mechanism.

DETAILED DESCRIPTION OF THE PRESENTLY PREFERRED EMBODIMENT

Figure 1:
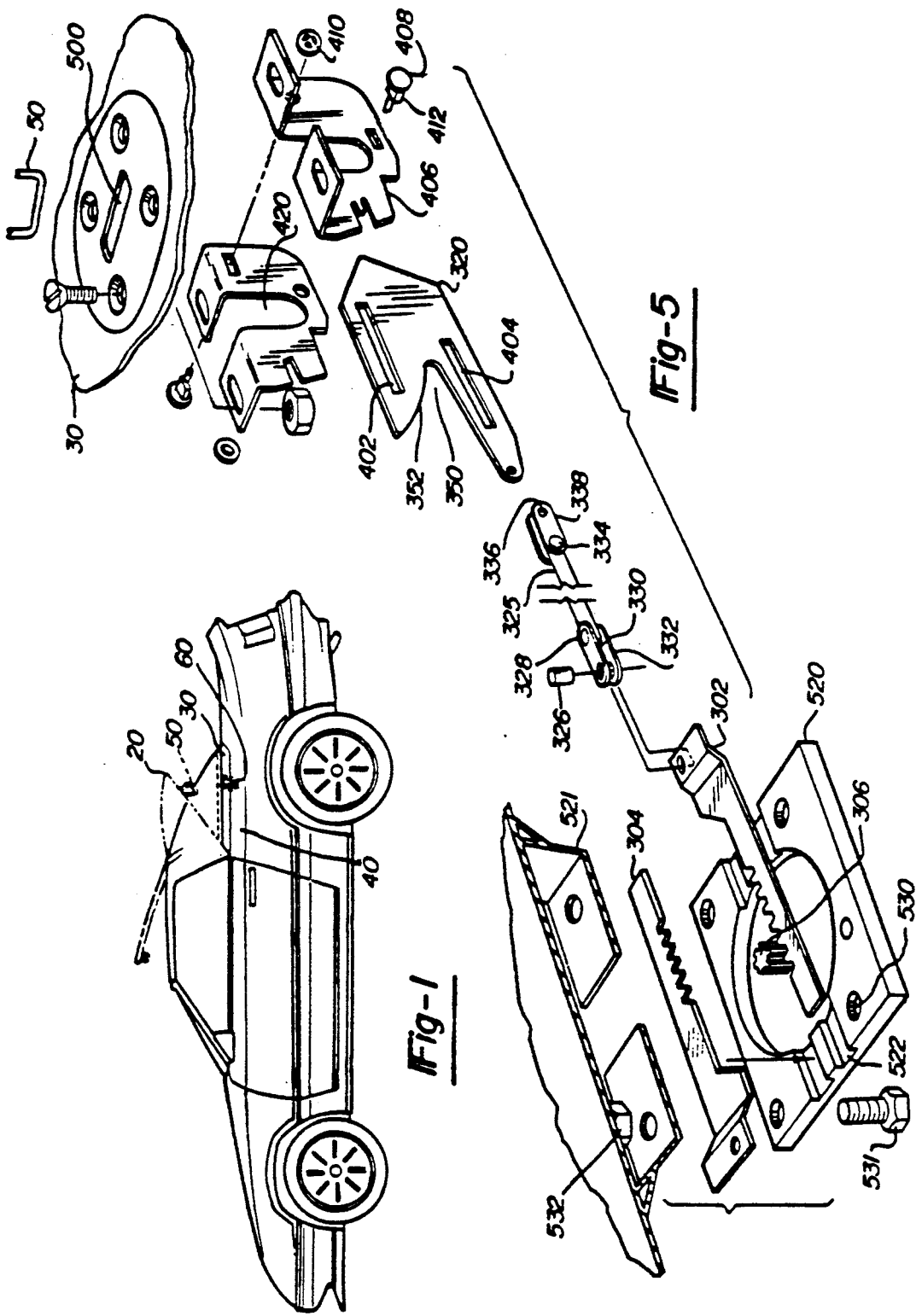
FIG. 1 illustrates the manner in which body panels such as a convertible top stack five bow and tonneau cover are movable with respect to the other body panels of an automobile.

As shown in FIG. 1, the latching and pull down mechanism of the presently preferred embodiment is adapted to secure the number five bow 20 to the tonneau cover 30 and rear quarter deck 40 of an automobile. More particularly, the number five bow 20 has a latch loop 50 which is engaged by a catch mechanism 60 to secure the number five bow.

As can be seen better in FIG. 2 through 5, the latch loop 50 is a generally round shaped, in this case a D-shaped loop. The latch loop 50 is comprised of quarter inch steel rod which is formed into a D-shape and spot welded to the underframing 104 of the five bow 20. It can be appreciated by one of ordinary skill in the art that the manner in which the latch loop 50 is affixed to the vehicle panel can be adapted to best suit the needs of the particular situation. For example, the latch loop could be riveted, or could be bolted so that the latch loop's position can be adjusted by slipping the latch loop's orientation with respect to the bolts. The latch loop 50 is aligned with respect to the longitudinal center line of the vehicle, with the catch mechanism 60 being aligned perpendicular to the latch loop. This particular alignment allows for a single drive mechanism 200 to operate both catches 60 at either outermost corner of the number five bow 20, as will be described in more detail later.

Figure 2:
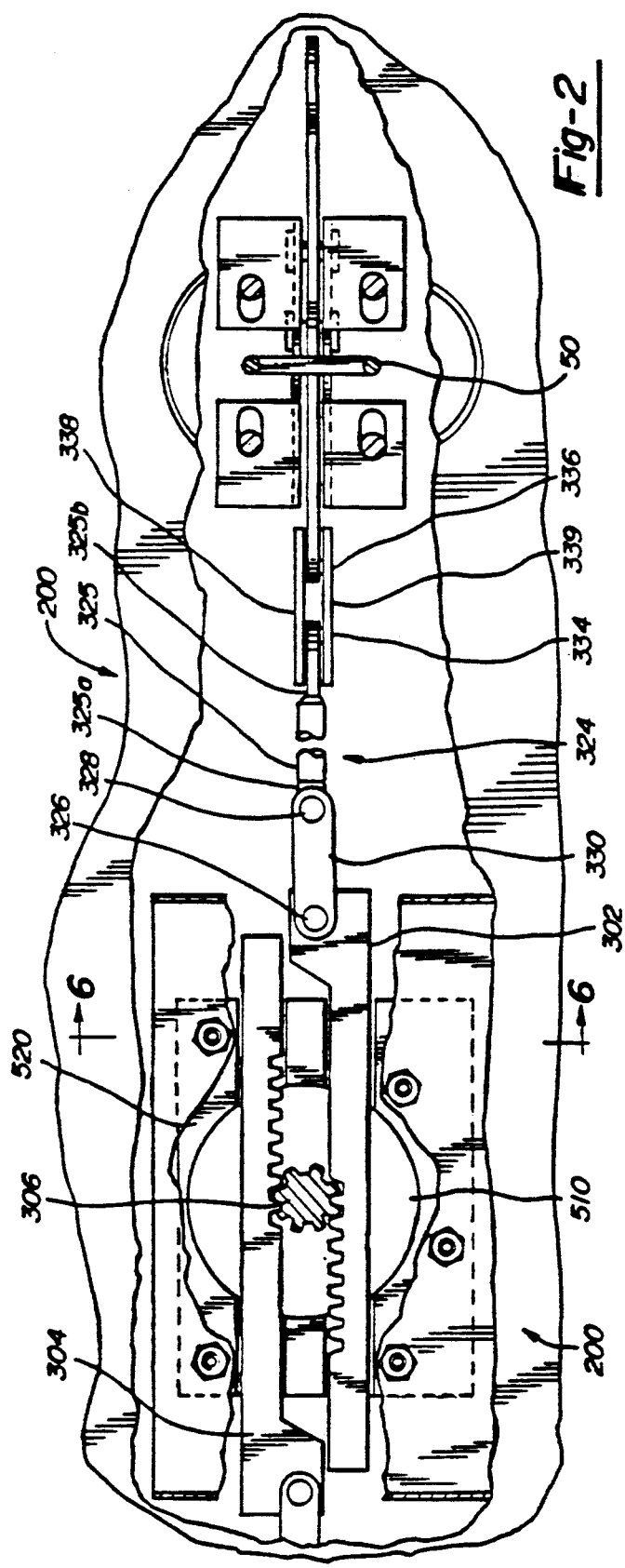
FIG. 2 is a partially broken away top view illustrating the catch mechanism.

The catch drive mechanism 200 is shown in greater detail in FIG. 2. The drive mechanism 200 includes a rack and pinion assembly having two opposing racks 302, 304 driven by a single pinion gear 306. The leftmost rack 302 translates laterally to engage and disengage the catch 320 for the latch loop 50 on the left side of the number five bow 20, while the right rack 304 translates to engage and disengage the catch for the right side latch loop. Because of this symmetry of operation, only the left side of the catch mechanism 60 has been shown. However, it can be appreciated that the configuration of the right side is substantially similar. This particular configuration allows both the leftmost and rightmost catch mechanisms 60 to be actuated by a single drive mechanism 200.

Referring again to FIGS. 2 through 5, the overall operation of the mechanism will be described in greater detail. A catch 320 engages the latch loop 50 to secure the number five bow 20. More particularly, as the pinion gear 306 rotates, the rack 302 translates laterally. Attached to the rack is a connecting rod assembly 324 which attaches to the catch 320. In this embodiment, the connecting rod assembly 324 includes a ⅛" steel rod 325 flattened on either end 325a, b attached on one end to the rack 302 by way of rivets 326, 328 and links 330, 332. The rod 325 is attached on the other end to the catch 320 by way of rivets 334, 336 and links 338, 339. It can be appreciated that ordinary skill can be used to modify the manner in which the rack 302 and and catch 320 are mechanically linked. Similarly, loading conditions encountered in a particular vehicle application may dictate that the connecting rod 325 be fashioned of heavier material. As viewed from the top, as shown in FIG. 2, clockwise rotation of the pinion gear 306 translates the left rack 302 and catch 320 from left to right, from a latch loop disengaged position (FIG. 3) to a latch loop engaged position (FIG. 4). Conversely, counter clockwise rotation of the pinion gear 306 translates the rack 302 and catch 320 from right to left, from a latch loop engaged position to a latch loop disengaged position. Here, because a rigid connecting rod assembly 324 is used, rack 302 "pulls" the left side catch to engage the latch loop 50, and "pushes" to disengage the catch 320 from the loop 50. Likewise, the right side catch is "pulled" by rack 304 to engage the latch loop on the right side and is "pushed" to disengaged. Thus, the single drive mechanism 200 accomplishes both the latching and unlatching function for both latching points.

As can best be seen in FIG. 5, the latch mechanism 60 includes the catch 320, which is formed from ¼" steel in a J-shape, with a latch notch 350 having a sloped edge 352 as the short leg of the "J". The catch, of course, may need to be fashioned from heavier material depending upon loading conditions. Along the lateral edges of catch 320, upper and lower guide tracks 402, 404 are formed. The catch bracket 406, which is bolted to the underside of the tonneau cover 30, has guide pins 408 that engage the guide slots 402, 404 of the catch 320, securing the catch vertically with respect to the bracket 406 while still allowing it to slide laterally within the bracket. The guide pins 408 are secured within the catch bracket 406 using rivet caps 410. The guide pins 408 have a flattened pin portion 412 which both engage the guide pin slots 414 of the catch bracket 406 as well as the guide slots 402, 404 of the catch 320.

The catch bracket 406 has a generally U-shaped channel 420 designed to allow the latch loop 50 to clear the catch bracket 406. This relationship can be better appreciated by referring to FIGS. 3 and 4. As the number five bow 20 is lowered into position, the latch loop 50 enters an access hole 500 in the tonneau cover 30. The latch loop 50, once through the access hole 500, enters the void in the channel 420 of the catch bracket 406. Thus, the channel 420 provides sufficient clearance for the latch loop 50 to reach the proper position for being engaged by the catch 320. As the catch 320 is moved from the disengaged (FIG. 3) to the engaged (FIG. 4) position, the latch loop 50 travels along the sloped portion 352 from the narrow end 354 toward the base 356 of the notch in a line of travel perpendicular to that of the movement of the catch. The final resting spot of the loop 50 is at the base 356, where the loop is fully engaged in the latch notch 350 of the catch 320. Should it be desired, a position sensor or switch can be placed at the base 356 to provide an indication whether or not the latch loop 50 is fully engaged. As the latch loop 50 is being engaged and travelling along the slope 352 of the catch 320, the number five bow 20 is pulled down and snugged against the tonneau cover 30. Thus, the latching mechanism is capable of pulling down the number five bow to ensure a snug fit when latched. As can be appreciated by referencing FIGS. 3 and 4, weather stripping 450 can be placed along the lower edge of the number five bow 20 where it contacts the tonneau cover 30 so as to provide a barrier to infiltration. As the number five bow 20 is snugged against the tonneau cover 30, the weather stripping 450 is compressed.

Figure 6:
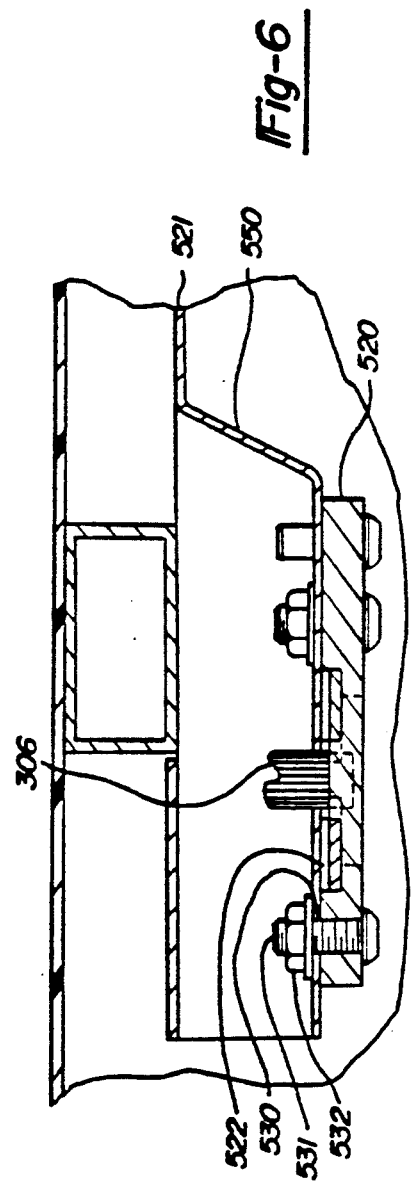
FIG. 6 is a broken away end view of the manner in which the catch mechanism is attached to the vehicle.

Referring again to FIG. 2, the drive mechanism 200 will be described in greater detail. The pinion gear 306 of the drive mechanism 200 is rotated by a 12 Volt D.C. electric gear motor 510, commercially available from any number of sources, such as Jideco or Nippondenso, with the pinion gear 306 affixed to the output shaft of the motor 510. The racks 304, 306 and motor 510 are held in place by a pair of mounting brackets 520, 521. As can be seen best by referring to FIG. 6, the lower mounting bracket 520 has channels 522, 524 which provide a track for the racks 304, 306 to slide within. Both the lower and upper mounting brackets 520, 521 include mounting holes 530 into which bolts 531 and nuts 532 are placed, securing the motor 510 to the lower mounting bracket 520 and the lower to the upper mounting bracket 521. The racks 302, 304 are sandwiched in place between the mounting brackets 520, 521 by bolts and nuts as well, with the entire mounting bracket and drive mechanism assembly 200 affixed to the underside of the tonneau cover 30 by way of spot welds. As can be seen in FIG. 6, the upper mounting bracket 521 has an S-shaped bend 550 to allow clearance of the drive gear 306 when the drive mechanism 200 is welded to the car. Of course, it can be appreciated that the configuration of the mounting brackets can be modified to best suit any particular vehicle using ordinary skill.

The latching mechanism of the present invention is able to both pull down the number five bow and secure it. This has the advantage of reducing the amount of intervention required of the car driver when trying to close the convertible top. For example, when used in conjunction with an automated top stack mechanism, the driver does not need to manually latch the number five bow. Instead, the latching mechanism of the present invention is able to "grab" the number five bow and pull it down to a secure position once the five bow is in the vicinity of its final resting position, without requiring the driver to manually push down on the number five bow to bring it into position for latching.

Even with a manually operable top stack, the latching mechanism of the present invention eases the car driver's task of ensuring all portions of the top stack are properly latched because of the latching mechanism's ability to begin engaging the latch loop when it is simply within the vicinity of its final "latched" resting position. As such, this particular latching mechanism can be easily adapted to latch the number one bow to the windshield header in a fashion similar to the way the five bow is latched to the rear body panels.

Furthermore, the latching mechanism described here can also be readily adapted for use in pulling down and securing other moveable panels such as the trunk lid, tonneau cover or even passenger doors and/or hatches.

Also, because the latching mechanism of the present invention employs a dual rack and pinion with rigid connecting rods, a single drive pinion can be used to "pull" both of the latches closed and "push" both of the latches open. This reduces the complexity of the latching mechanism without sacrificing performance. It can be appreciated, however, that should concerns like packaging or weight become a problem, the drive mechanism can be modified to take the form of a dual rack and pinion with non rigid connections between the racks and catches. In such an embodiment, one rack translates to engage the left catch and disengage the right catch, while the other rack translates to engage the right catch and disengage the left catch. Or, a window shade mechanism could be employed whereby the drive mechanism causes a flexible cord or cable to be spooled and unspooled to translate the catches between the engaged and disengaged positions. However, regardless of the particular configuration of the drive mechanism, a single drive mechanism can still be used to move both catches, thereby still retaining the complexity reduction advantages of the presently preferred embodiment.

The foregoing description of the presently preferred embodiment was provided for the purposes of illustration. It can be appreciated that one of ordinary skill in the art could exercise modifications without departing from the spirit or scope of the invention disclosed.

We claim:

1. An apparatus for securing the free-moving portion of a hinged bow of an automotive convertible top to the automobile body structure so that the underside of said bow lies substantially flush with the exterior surface of said automobile body structure, said apparatus comprising:
   a plurality of latching means, affixed to the underside of said bow, for providing securing points on said bow;
   a plurality of catch means, mechanically connected to the interior side of said automobile body structure, for engaging said latching means and securing said bow to said automobile at said securing points, said automobile body structure having a plurality of passageways formed therein through which said plurality of latching means pass to allow mechanical communication between said latching means and said catching means at the interior side of said automobile body structure; and
   a drive means, mechanically linked with said catch means, for selectively engaging said latching and catch means to secure said bow to said automobile body structure;
   said drive means comprising a central drive mechanism for engaging said latching and catching means by moving said catch means toward said central drive mechanism and said central drive mechanism disengaging said catching means from said latching means by moving said catch means away from said central drive mechanism, said mechanical link between said drive means and said catch means being fixedly attached to said catch means and being in tension when said drive means is engaging said catch means and being in compression when said drive means is disengaging said catch means.

2. The apparatus of claim 1 wherein each said latching means comprises a securing loop affixed to the underside of said bow.

3. The apparatus of claim 2 wherein each said catch means comprises a catch and wherein said drive means comprises a catch drive, said catches adapted to engage and disengage said securing loops, and said catch drive adapted to move said catches in a line of travel to and from securing loops engaged positions and securing loops disengaged positions.

4. The apparatus of claim 3 wherein said catch comprises a sloped surface adapted to contact said securing loop and draw said securing loop perpendicular to said catch line of travel so as to engage and disengage said securing loop from said catch as said catch moves to and from said engaged and disengaged positions.

5. The apparatus of claim 4 wherein said catch drive comprises a pinion gear and racks, wherein rotation of said pinion gear causes each said rack to translate in said catch line of travel, wherein said translation of said racks moves said catches to and from said engaged and disengaged positions.

6. The apparatus of claim 5 wherein said catches are connected to said racks by way of connecting rod assemblies.

7. The apparatus of claim 4 wherein said catch drive comprises an engage drive and a disengage drive, said engage drive adapted to move said catches from said disengaged positions to said engaged positions and said disengage drive adapted to move said catches from engaged positions to said disengaged positions.

8. An apparatus for securing a moveable panel to a fixed panel such that said moveable panel lies substantially flush with said fixed panel, said apparatus comprising:
   at least one target means, affixed to the underside of said moveable panel, for providing a securing point for said moveable panel;
   at least one securing means, mechanically connected to the underside of said fixed panel and adapted to interact with said target means, for engaging said target means to secure said moveable panel to said fixed panel at said securing point, said fixed panel having at least one passageway therein through which said target means passes to allow mechanical communication between said target means and said securing means on said underside of said fixed panel; and
   drive means for selectively engaging and disengaging said securing means to and from said target means.
   said drive means comprising a central drive mechanism for engaging said securing and target means by moving said securing means toward said central drive mechanism and said central drive mechanism disengaging said securing means from said target means by moving said securing means away from said central drive mechanism, said drive means and said securing means being mechanically linked, said mechanical link between said drive means and said securing means being fixedly attached to said securing means and being in tension when said drive means is engaging said securing means and being in compression when said drive means is disengaging said securing means.

9. The apparatus of claim 8 wherein each said target means comprises a latching loop disposed on the side of said moveable panel closest to said fixed panel.

10. The apparatus of claim 9 wherein each said securing means comprises a latching catch adapted to engage said latching loop.

11. The apparatus of claim 10 wherein each said latching catch has a sloped notch adapted to receive said latching loop, said latching loop, when being engaged by said latching catch, riding along said sloped notch until said latching loop is engaged in said latching catch.

12. The apparatus of claim 11 wherein said drive means comprises a latching drive adapted to translate each said latching catch with respect to said latching loop.

13. The apparatus of claim 12 wherein said latching drive translates each said latching catch in a predetermined line of travel and wherein said sloped notch of said latching catches are aligned at an acute angle with respect to said line of travel and wherein said latching loops translate perpendicular to said line of travel as said latching catches translate and said latching loops ride along said sloped notches of said latching catches.

14. The apparatus of claim 13 wherein said latching drive comprises at least one rack and pinion assembly, each said rack connected to one of said latching catches, each said rack adapted to translate in said line of travel, said pinion rotating to translate said racks and said latching catches in and out of engagement with said latching loops.

15. The apparatus of claim 14 wherein each said rack is connected to said latching catch by way of a connecting rod and linkage assembly of said mechanical link.

16. An apparatus for automatically latching and unlatching an automotive convertible top to the automobile body, said apparatus comprising:
at least one latching point on said convertible top, each said latching point passing from the exterior of said automobile body to the interior of said automobile body through a corresponding passageway in said automobile body; and
a latch mechanism mechanically connected to said automobile body at the interior for engaging each said latching point to secure said convertible top of said automobile body at each said latching point
said latch mechanism comprising a central drive and at least one catch fixedly attached to a mechanical linkage linking said catch to said central drive, said central drive engaging said latching point and catch by moving said toward said central drive and said central drive disengaging said latching point from said catch by moving said catch away from said central drive, said mechanical linkage between said latch mechanism and said catch being in tension when said latch mechanism is engaging said catch and being in compression when said latch mechanism is disengaging said catch.

17. The apparatus of claim 16 wherein said latch mechanism is translatable between an open and a closed position.

18. The apparatus of claim 17 wherein said latch mechanism engages said latching points whenever said convertible top is within a predetermined vicinity of said automobile body and said latch mechanism is in said open position.

19. The apparatus of claim 18 wherein said latch mechanism translates from said open to said closed position once said latching points are engaged.

20. The apparatus of claim 19 wherein said convertible top is drawn against said automobile body to secure said convertible top as said latch mechanism translates from said open position to said closed position.

* * * * *

UNITED STATES PATENT AND TRADEMARK OFFICE
CERTIFICATE OF CORRECTION

PATENT NO. : 5,301,987
DATED : April 12, 1994
INVENTOR(S) : Stephen P. Tokarz; David J. Siefert; Stanley S. Maday It is certified that error appears in the above-indentified patent and that said Letters Patent is hereby corrected as shown below:

Column 8, line 1, "of" should be -- to --.

Column 8, line 7, after "said" (first occurrence) insert -- catch --.

Signed and Sealed this

Twenty-third Day of August, 1994

Attest:

BRUCE LEHMAN

Attesting Officer

Commissioner of Patents and Trademarks